2,841,604

DIALKYL MONOCHLOROMETHANEPHOSPHONATE ESTERS CONTAINING FROM 3 TO 10 CARBON ATOMS IN THE HYDROCARBON RADICALS

Arthur Dock Fon Toy, Park Forest, and Kenneth H. Rattenbury, Chicago Heights, Ill., assignors to Victor Chemical Works, a corporation of Illinois No Drawing. Application August 23, 1954
Serial No. 458,004

5 Claims. (Cl. 260—461)

This invention relates to dialkyl monochloromethanephosphonate esters containing from 3 to 10 carbon atoms in the hydrocarbon radicals.

The plasticizers commonly available normally are of little or no value at low temperatures. There is an increasing demand for civilian and military purposes for such low temperature plasticizers, particularly for use in artificial leathers for garments, seat covers for trucks, and other items which must remain flexible at low temperatures.

The plasticizing agents of this application likewise are of particular value in their ability to impart flame-resistant characteristics to the plasticized resin products. This characteristic varies somewhat with the type of resin employed. For example, excellent flame resistance is obtained with Vinylite, cellulose acetate and ethyl cellulose, whereas with nitrocellulose very little increase in flame resistance is obtained though an excellent low temperature plasticization is effected.

In the preparation of the new plasticizing compounds, it is first necessary to prepare, by known means, the monochloromethanephosphonic dichloride, and then react this material with the desired alcohol under suitable conditions to produce the dialkyl ester of the monochloromethanephosphonic acid. For example, the preferred ester, di(2-ethylhexyl) monochloromethanephosphonate was prepared by reacting monochloromethanephosphonic dichloride and 2-ethyl hexanol in the following manner:

In a three-necked liter flask equipped with thermometer and dropping funnel were placed 468.0 grams of 2-ethyl hexanol (1.2 moles+200% excess). The system was evacuated to 20 mm. pressure and 100.5 grams of monochloromethanephosphonic dichloride (0.6 mole) added dropwise while maintaining the temperature between 25 and 30° C. The addition took one hour and eleven minutes. The flask was then pumped at 20 mm. pressure for 2 hours at 25–30° C., 15 minutes at 35° C., 15 minutes at 45° C., and 15 minutes at 50° C. The pressure was reduced to 4 mm. and the heating continued for one and one-half hours to substantially remove all of the liberated hydrogen chloride. The solution was then transferred to a distillation unit and the excess 2-ethyl hexanol distilled off at 3 mm. pressure and 53–63° C. The crude product was washed with 300 ml. of 5% NaHCO₃ solution and the organic layer separated and distilled at 150 to 163° C. at 1 mm. pressure yielding 189.4 grams (93.5% yield) of di(2-ethylhexyl) monochloromethanephosphonate. The ester product had an index of refraction $N_D^{25}=1.4505$ and an acidity equal to 0.35 ml. of 0.1 N NaOH per 10 grams.

In another example dipropyl chloromethanephosphonate was made by reacting n-propanol and chloromethanephosphonic dichloride using triethylamine as a hydrogen chloride acceptor, as follows:

In a three-necked 5 liter flask was placed 315.0 grams of n-propanol (5.0 moles plus 5% excess), 530.2 grams of triethylamine (5.0 moles plug 5% excess) and 2 liters of benzene. The solution was cooled to 0.0° C. and 419 gram (2.5 moles) of monochloromethanephosphonic dichloride added dropwise with stirring at 0–5° C. over a 2 hour and 50 minute period. The slurry was stirred for one hour at 0–5° C. and allowed to stand over night. The slurry was then filtered to remove the amine hydrochloride and the cake washed with 900 ml. of benzene. The filtrate was placed in a 5 liter distillation unit and the volatiles stripped off at 50° C. and 1 mm. pressure. The liquid product was then distilled at a vapor temperature of 78–90° C. at 1 mm. pressure yielding 435.0 grams (81.4% yield) of di-n-propyl monochloromethanephosphonate having an index of refraction $N_D^{25}=1.4395$.

In a similar manner other dialkyl monochloromethanephosphonates were prepared having the properties shown in the following Table I.

Table I

| | Monochloromethanephosphonates | | | | | | | |
|---|---|---|---|---|---|---|---|---|
| | Dipropyl | Dibutyl | Diamyl | Dihexyl | Di-iso-octyl | Di (2-ethylhexyl) | Dinonyl | Didecyl |
| Boiling point, °C | 72–82 | 101 | 122–130 | 124–138 | 155 | 155 | 165 | 201 |
| Press., mm | 1.0 | 1.5 | 1.0–2.0 | 2.0 | 1.0 | 1.0 | 1.0 | 1.0 |
| Refractive index $N_D^{25}$ | 1.4395 | 1.4418 | 1.4443 | 1.4462 | 1.4509 | 1.4509 | 1.4570 | 1.4545 |
| Acidity, ml. 1/10 N NaOH/gm | 0.02 | 0.03 | 0.01 | 0.01 | 0.01 | 0.06 | 0.03 | 0.03 |
| Color | (¹) | (¹) | (¹) | (¹) | (¹) | (¹) | (¹) | (¹) |
| Sp. gr | 1.1267 | 1.0782 | 1.0373 | 1.0193 | 0.9891 | 0.9949 | 0.9736 | 0.9698 |
| Found: | | | | | | | | |
| Percent P | 14.1 | 12.7 | 11.3 | 10.4 | 8.7 | 8.8 | 8.0 | 7.5 |
| Percent Cl | 16.3 | 14.8 | 13.0 | 11.9 | 10.0 | 10.1 | 9.2 | 8.5 |
| Calc'd: | | | | | | | | |
| Percent P | 14.4 | 12.8 | 11.5 | 10.4 | 8.7 | 8.7 | 8.1 | 7.5 |
| Percent Cl | 16.5 | 14.7 | 13.1 | 11.9 | 10.0 | 10.0 | 9.2 | 8.5 |
| Thermal stability, percent decomposed | 2.78 | 2.21 | — | — | — | 3.55 | — | — |
| Hydrolytic stability, percent decomposed | 10.0 | 2.8 | — | — | — | 0.12 | — | — |
| Volatility, percent weight loss | 0.7 | 0.2 | — | — | — | 0.1 | — | — |
| Freezing point, °C | −38° | (²) | (²) | (²) | (²) | (²) | (²) | (²) |
| Flash point: | | | | | | | | |
| Open | (³) | (³) | | | (³) | (³) | | |
| Closed | (⁴) | (⁴) | | | (⁴) | (⁴) | | |
| Viscosity, cp. 30° C | 12 | 16 | — | — | 19 | 21 | — | — |
| Surface tension, Dynes/cm.² at 30° C | 26.0 | 27.3 | — | — | 27.5 | 28.1 | — | — |

NOTE.—The "dashes" indicate instances where no determination was made.
¹ Water=white.
² Viscous liquid at −70°.
³ Over 250° F.
⁴ Over 360° F.

The data on thermal stability in the above Table I were determined by placing a weighed amount of the ester in a 3-necked flask equipped with stirrer and thermometer and heating at 145–150° C. for 24 hours. The increased acidity as determined by titration with 1 N caustic soda was used to calculate the percentage of ester decomposition.

Hydrolytic stability was determined by refluxing a mixture of 100 ml. water and 20 grams of the ester for a period of 24 hours, cooling and titrating the aqueous phase with 1/3 N caustic soda to determine developed acidity which was then calculated as percentage of ester decomposition.

Volatility was determined by heating the ester in a flask with stirring at 145–150° C. for 24 hours and determining the percentage weight loss.

The above ester compounds are soluble in methanol, ethanol, acetone, methyl acetate, benzene, hexane and carbon tetrachloride, but insoluble in water.

All of the above described esters have been found to be excellent low temperature plasticizers for Vinylite resin films and impart excellent flame-resistant character to the Vinylite resin films.

The propyl to hexyl species of the above esters have excellent low temperature plasticizing and flame retardant characteristics with cellulose acetate resin films.

All of the above esters are excellent low temperature plasticizers for ethyl cellulose and nitrocellulose resin films but do not greatly enhance the flame effect on such resin films.

The low volatility, high thermal stability and low temperature fluidity of the above esters make them highly suitable for use as hydraulic fluids, particularly under low temperature conditions.

The following data illustrates the fluidity of the esters shown therein:

*Table I–A*

| Compound | Viscosity, centipoises | | Viscosity index |
|---|---|---|---|
| | 105° F. | 212° F. | |
| Dipropyl ester | 4.1 | 1.6 | |
| Dibutyl ester | 4.65 | 1.8 | |
| Di(2Et-hexyl) ester | 9.85 | 2.7 | 129.9 |
| Diisooctyl ester | 11.1 | 3.4 | 194.0 |

The viscosity indexes shown were calculated from the above viscosity data by the method described in ASTM Standard QD 151, Am S3, 1953–5, p. 88.

Plasticized resin products may be produced by intimately mixing with the desired resin material a plasticizing proportion of the monochloromethanephosphonate, with or without the aid of suitable solvents. In general, it has been found that desirable plasticizing effects may be obtained where the proportion of the plasticizing ester is within the range of 20 to 40 parts by weight per 100 parts of the resin to be plasticized. Such plasticized products are suitable for use as molding compounds or in the form of films or coatings in a variety of commercial applications.

Evaluation of the new monochloromethanephosphonates as plasticizers was made by dissolving the resin and plasticizer compound in a suitable mutual solvent, casting films therefrom of uniform thickness and evaporating off the solvents to obtain dry plastic films. Films were made using Vinylite (a copolymer of 80–95% vinyl chloride and 20–5% vinyl acetate), ethyl cellulose, cellulose acetate and nitrocellulose and several plasticizing proportions of the various dialkyl monochloromethanephosphonates. The films were then tested to evaluate the plasticizer and determine the characteristics of the plasticized resin products. Some typical examples are shown in Table II.

Film clarity is determined by visual observation, and is a measure of the compatibility of the resin and the plasticizer. Cloudiness in the film is an indication of incompatibility and is an undesirable characteristic though it does not necessarily mean that no plasticizing effect is present.

"Exudate" is a term used to designate the presence of exuded plasticizer on the surface of the plasticized resin film. Its presence or absence is determined by rubbing a cigarette paper over the surface of the film (previously dried for 4 hours at 80° C.) and noting whether or not the paper shows any absorption of the plasticizer. The test is a measure of compatibility not observable by the visual clarity of film test. The examples reported in Table II show that in all cases the new plasticizing agents are compatible with resins tested.

Flammability of the plasticized resin films was determined by holding a flame at the bottom of a vertically-hung film (approx. 0.03 inch thick) for several seconds, then removing the flame. If the film continued to burn, it was designated as "flammable." If the flame is immediately extinguished, it is designated "self-extinguishing." If the film chars or melts without flaming except during the application of the flame source, it is said to be "non-flammable." From the examples shown in Table II, the new esters are excellent plasticizers for Vinylite, cellulose acetate, nitrocellulose and ethyl cellulose resins, but the additional advantage of increased flame-resistance is of considerable importance only in connection with the Vinylite and cellulose acetate resins.

Moduli of rigidity as reported for some of the plastic films in Table II represent a quantitative measure of the flexibility of the films at a temperature of about minus 50° C. The lower the figure reported, the more desirable and more flexible is the film at the low temperature. Thus, for example, the preferred plasticizers for Vinylite film are within the group ranging from dibutyl to dioctyl monochloromethanephosphonates. However, all of the ester compounds ranging from the dipropyl to didecyl esters are highly satisfactory low temperature plasticizers when compared to the plasticizing effect of tricresyl phosphate, a well known plasticizer of the prior art. The modulus of rigidity test was made using a modification of the procedure and apparatus described in the paper "Measurement of Flexibility of Lacquer Films" (Products Finishing, May 1952). The procedure consists of suspending a uniform strip of the plastic film from a torque calibrated wire with a definite weight attached to the lower end of the film strip. A slot in the frame near the lower end prevents this end of the film strip from twisting. At the top of the apparatus is a calibrated rotation element attached to the torque calibrated wire. From the torque measurement when the film strip is twisted through a 90° angle the modulus of rigidity is calculated from the formula by St. Venant (British Air Ministry Specifications)

$$G = \frac{TL}{cd^3ab}$$

where, G is the modulus of rigidity in dynes/cm.$^2$; where $T$=applied torque in dynes/cm.; $L$=length of film strip, cm.; $C$=width, cm.; $d$=thickness, cm.; $b$=angle of twist, radians; and $a$=constant 0.313 for flat strip shape.

The testing apparatus is placed in a vessel maintained at the desired temperature while conducting the tests. In the present examples, the temperature was held at minus 50° C.±1°. The film thickness was 0.035 inch±0.0003 and the width 0.25 inch±0.004.

Qualitative low temperature flexibility tests having good correlation with the above tests were made on films of Table II by immersing film specimens in a vessel at minus 50° C. and bending the films with tongs a number of times. All of the plastic film of Table II tested showed good to excellent flexibility at minus 50° C.

Table II

| Resin | Plasticizer | Ratio resin/plasticizer | Solvent | Film clarity | Exudate | Flexibility at -50° C. | Flammability | Moduli of rigidity |
|---|---|---|---|---|---|---|---|---|
| Vinylite (copolymer of 95% vinyl chloride and 5% vinyl acetate). | Dipropyl monochloromethanephosphonate. | 100/20 | Methylethyl ketone. | Clear | None | Excellent | Self extinguishing | 6.5×10⁹ |
| | do | 100/30 | do | do | do | do | do | |
| | do | 100/40 | do | do | do | do | do | |
| | Dibutyl monochloromethanephosphonate. | 100/20 | do | do | do | do | do | 6.7×10⁹ |
| | do | 100/30 | do | do | do | do | do | |
| | do | 100/40 | do | do | do | do | do | |
| | Di(2-ethylhexyl) monochloromethanephosphonate. | 100/20 | do | do | do | do | do | 5.8×10⁹ |
| | do | 100/30 | do | do | do | do | do | |
| | do | 100/40 | do | do | do | do | do | |
| | Diisooctyl monochloromethanephosphonate. | 100/20 | do | do | do | do | do | 6.5×10⁹ |
| | Dinonyl monochloromethanephosphonate. | 100/20 | do | do | do | Good | do | 7.7×10⁹ |
| | Didecyl monochloromethanephosphonate. | 100/20 | do | do | do | do | do | 6.7×10⁹ |
| | Tricresyl phosphate | 100/20 | do | do | do | Poor | do | 9.3×10⁹ |
| Cellulose acetate | Dipropyl monochloromethanephosphonate. | 100/20 | Acetone | do | do | | do | |
| | do | 100/30 | do | do | do | Excellent | do | |
| | do | 100/40 | do | do | do | | do | |
| | Dibutyl monochloromethanephosphonate. | 100/20 | do | do | do | Excellent | do | |
| | do | 100/30 | do | do | do | | do | |
| | do | 100/40 | do | do | do | | do | |
| | Diamyl monochloromethanephosphonate. | 100/30 | do | do | do | | do | |
| | Dihexyl monochloromethanephosphonate. | 100/30 | do | do | do | Excellent | do | |
| | Diisooctyl monochloromethanephosphonate. | 100/20 | do | Sl. cloudy | do | | do | |
| | Di(2-ethylhexyl) monochloromethanephosphonate. | 100/20 | do | Cloudy | do | | Flammable | |
| Nitrocellulose | Tricresyl phosphate | 100/20 | do | White ppt | do | Poor | Nonflammable | |
| | Dipropyl monochloromethanephosphonate. | 100/20 | Mixture of methylethyl ketone, butyl acetate, toluene, and ethanol. | Clear | do | | Flammable | |
| | do | 100/30 | do | do | do | Excellent | do | |
| | do | 100/40 | do | do | do | | do | |
| | Dibutyl monochloromethanephosphonate. | 100/20 | do | do | do | | do | |
| | do | 100/30 | do | do | do | | do | |
| | do | 100/40 | do | do | do | | do | |
| | Diisooctyl monochloromethanephosphonate. | 100/20 | do | do | do | | do | |
| | Di(2-ethylhexyl) monochloromethanephosphonate. | 100/20 | do | do | do | | do | |
| | Tricresyl phosphate | 100/20 | do | | do | Poor | do | |
| Ethyl cellulose | Dipropyl monochloromethanephosphonate. | 100/20 | Mixture of ethanol and toluene. | Clear | do | | do | |
| | do | 100/30 | do | do | do | Excellent | do | |
| | do | 100/40 | do | do | do | | do | |
| | Dibutyl monochloromethanephosphonate. | 100/20 | do | do | do | | do | |
| | do | 100/30 | do | do | do | | do | |
| | do | 100/40 | do | do | do | | do | |
| | Diisooctyl monochloromethanephosphonate. | 100/20 | do | do | do | | do | |
| | Di(2-ethylhexyl) monochloromethanephosphonate. | 100/20 | do | do | do | | do | |
| | Tricresyl phosphate | 100/20 | do | do | do | Poor | do | |

Note.—The "dashes" indicate instances where no determination was made.

General plasticity of the plasticized films at room temperature were determined organoleptically by at least three observers and all of the films plasticized with the new esters were rated as having good to excellent plasticity.

It will be noted from the foregoing tables and discussion that all of the compounds having from 3 to 10 carbon atoms in the hydrocarbon radical have considerable value for the purposes disclosed. The compounds with 4 to 8 carbon atoms in the hydrocarbon radical, however, have improved values for some of the purposes described.

The foregoing detailed description has been given for clearness of understanding only and no unnecessary limitations should be understood therefrom as modifications will be obvious to those skilled in the art.

We claim:

1. A water-insoluble dialkyl monochloromethanephosphonate of the formula

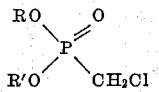

where R and R' are aliphatic hydrocarbon radicals having at least 3 and not more than 10 carbon atoms.

2. A water-insoluble dialkyl monochromomethanephosphonate of the formula

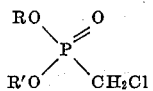

where R and R' are aliphatic hydrocarbon radicals having at least 4 and not more than 8 carbon atoms.

3. Dipropyl monochloromethanephosphonate, said compound being water-insoluble.

4. Dibutyl monochloromethanephosphonate, said compound being water-insoluble.

5. Di(2-ethylhexyl) monochloromethanephosphonate, said compound being water-insoluble.

References Cited in the file of this patent

UNITED STATES PATENTS 2,550,651     Dickey et al.            Apr. 24, 1951
2,573,568     Harman et al.           Oct. 30, 1951

(Other references on following page)

UNITED STATES PATENTS

| 2,694,689 | Gamrath et al. | Nov. 16, 1954 |
| 2,708,204 | Bell et al. | May 10, 1955 |
| 2,714,100 | Toy et al. | July 26, 1955 |
| 2,725,311 | Kenaga et al. | Nov. 29, 1955 |
| 2,787,629 | Coover et al. | Apr. 2, 1957 |

FOREIGN PATENTS

| 603,840 | France | Apr. 23, 1926 |

OTHER REFERENCES

Ellis: "Chemistry of Synthetic Resins," vol. 1, page 13.

Habachnik: 46 Chem. Ab. 421c (1952).

UNITED STATES PATENT OFFICE
CERTIFICATE OF CORRECTION

Patent No. 2,841,604                      July 1, 1958

Arthur Dock Fon Toy et al.

It is hereby certified that error appears in the printed specification of the above numbered patent requiring correction and that the said Letters Patent should read as corrected below.

Column 2, line 26, for "plug" read -- plus --; line 28, for "gram" read -- grams --; columns 5 and 6, Table II, the term "Nitrocellulose" appearing under the heading "Resin" should be lowered one line.

Signed and sealed this 9th day of December 1958.

(SEAL)
Attest:

KARL H. AXLINE
Attesting Officer

ROBERT C. WATSON
Commissioner of Patents